US012499095B2

(12) United States Patent
Galante et al.

(10) Patent No.: US 12,499,095 B2
(45) Date of Patent: Dec. 16, 2025

(54) AUTOMATED SYNCHRONIZATION OF THIRD-PARTY DATA FROM WITHIN A COLLABORATIVE ELECTRONIC DATA PLATFORM

(71) Applicant: Google LLC, Mountain View, CA (US)

(72) Inventors: Gregory Galante, Little Silver, NJ (US); Dennis Hu, Mountain View, CA (US); Yu Xin Cheng, Kitchener (CA); Dennis Jing Jing Liang, Mississauga (CA); Behnoosh Hariri, Mountain View, CA (US); Bikin Chiu, Mississauga (CA); Matthew Izatt, Toronto (CA); Miles Henrichs, New York, NY (US); Shawn Thomas Leslie, Louisville, CO (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/403,687

(22) Filed: Jan. 3, 2024

(65) Prior Publication Data

US 2025/0217326 A1 Jul. 3, 2025

(51) Int. Cl.
*G06F 16/178* (2019.01)
*G06F 16/176* (2019.01)
*H04L 67/1095* (2022.01)

(52) U.S. Cl.
CPC .......... *G06F 16/178* (2019.01); *G06F 16/176* (2019.01); *H04L 67/1095* (2013.01)

(58) Field of Classification Search
CPC .. H04L 16/178; H04L 16/176; H04L 67/1095
See application file for complete search history.

(56) References Cited

U.S. PATENT DOCUMENTS

| 8,719,222 | B2 * | 5/2014 | Richardson | ......... G06F 16/1834 |
| | | | | 707/622 |
| 9,747,582 | B2 * | 8/2017 | Hunter | ..................... H04L 67/10 |
| 2015/0172381 | A1 * | 6/2015 | Krueger | .............. H04L 67/1095 |
| | | | | 715/751 |
| 2017/0017551 | A1 * | 1/2017 | Nichols | ............... H04L 67/1095 |
| 2017/0140047 | A1 | 5/2017 | Bendig et al. | |

(Continued)

OTHER PUBLICATIONS

International Search Report and Written Opinion for International Application No. PCT/US2025/010318, mailed Mar. 13, 2025, 17 Pages.

*Primary Examiner* — Kris E Mackes
(74) *Attorney, Agent, or Firm* — Lowenstein Sandler LLP

(57) ABSTRACT

A method includes providing, by a collaborative electronic data platform, a collaborative electronic document for presentation on a first device of a first user. The collaborative electronic document includes a table associated with a third-party platform. The method includes determining a table synchronization option is activated, and sending via an API, a request to synchronize content of the table in the collaborative electronic document with content associated with the third-party platform. The method includes receiving, via the API, data for the table and updating the table. In response to input of the first user, the method includes adding data to the table and causing the table to be presented on the first device. In response to input of a second user, the method includes adding data to the table and causing the table to be presented on the first device.

20 Claims, 8 Drawing Sheets

(56) References Cited

U.S. PATENT DOCUMENTS

| | | |
|---|---|---|
| 2019/0138587 A1 | 5/2019 | Silk et al. |
| 2019/0179876 A1* | 6/2019 | Zhang .................. G06F 40/106 |
| 2020/0210383 A1* | 7/2020 | Demaris ............... G06F 16/168 |
| 2021/0342361 A1* | 11/2021 | Radzewsky ............. G06F 16/23 |
| 2022/0036311 A1 | 2/2022 | Didrickson et al. |
| 2022/0222431 A1* | 7/2022 | Zionpour ................ G06F 40/30 |
| 2023/0244802 A1* | 8/2023 | Paul ..................... G06F 16/176 |
| | | 707/608 |

* cited by examiner

FIG. 3A

Primary Data Type 301 | Data Type 303A | ... | Data Type 303N

Data Object 351 | Data Item 353A | ... | Data Item 353N

350

AUTOMATED SYNCHRONIZATION OF THIRD-PARTY DATA FROM WITHIN A COLLABORATIVE ELECTRONIC DATA PLATFORM

TECHNICAL FIELD

Aspects and implementations of the present disclosure relate to an automated synchronization of third-party data from within a collaborative electronic data platform.

BACKGROUND

Data can be stored on multiple third-party platforms. Each third-party platform can have a respective user interface or process for data creation or data synchronization. With multiple user interfaces for each respective third-party platform, moving data into or out of a third-party platform can be a manual process.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure provides a computer-implemented method including: providing, by a collaborative electronic data platform, a collaborative electronic document for presentation on a first user device of a first user, the collaborative electronic document comprising a table associated with a third-party platform; determining that a table synchronization option is activated for the table; sending, via an application programming interface (API) for the third-party platform, a synchronization request to synchronize content of the table in the collaborative electronic document with content of one or more sources associated with the third-party platform; receiving, via the API, data for the table and updating the table using the received data; in response to first user input of the first user, adding first new data to the table and causing the table with the added first new data to be presented on the first user device; and in response to second user input of a second user of a second user device, adding second new data to the table and causing the table with the second new data to be presented on the first user device.

In some aspects, the table is based on a tabular data schema identifying one or more data types. The tabular data schema is associated with the content of the one or more sources associated with the third-party platform.

In some aspects, the one or more data types comprise at least one of a data item or a data object. A respective data object comprises a plurality of respective data items.

In some aspects, the respective data object is added to the table of the collaborative electronic document as the plurality of respective data items.

In some aspects, the tabular data schema is configured by the third-party platform.

In some aspects, the collaborative electronic document comprises a second table associated with the third-party platform. The second table is based on a second tabular data schema identifying one or more second data types. The method further includes: determining that the table synchronization option is activated for the second table; sending, via the API, a second synchronization request to synchronize content of the second table in the collaborative electronic document with content of one or more second sources associated with the third-party platform, wherein the second tabular data schema is associated with content of the one or more second sources; receiving, via the API, second data for the second table and updating the second table using the second data; and causing the second table to be available for presentation on the first user device.

In some aspects, the method further includes: receiving, via the API, a first third-party synchronization request to synchronize content of the table in the collaborative electronic document with content of one or more sources associated with the third-party platform; and sending to the third-party platform, via the API, a portion of the table.

In some aspects, the method further includes; receiving, via the API, a second third-party synchronization request to synchronize content of the table in the collaborative electronic document with content of one or more second sources hosted by a second third-party platform; and sending to the second third-party platform, via the API, a portion of the table.

In some aspects, the method further includes: in response to the first user input, sending a second synchronization request to synchronize content of the table in the collaborative document with the content of the one or more sources associated with the third-party platform; and sending to the third-party platform, a portion of the table.

In some aspects, the table is also associated with a second third-party platform, and the method further includes: sending to the second third-party platform, a portion the table.

In some aspects, the portion of the table is sent to the third-party platform via a first API, and to the second third-party platform via a second API.

In some aspects, the first user input includes at least one of a data item, and a data object, wherein the data object includes a plurality of first data items.

In some aspects, the method further includes: causing the table to be presented on the first user device comprises providing a graphical user interface (GUI) presenting the table and allowing the first user to provide the first user input for the collaborative electronic document, wherein the first user input comprises at least one of an addition action, a deletion action, a duplication action, or a transfer action.

An aspect of the disclosure provides a computer-implemented method that includes: causing, by a collaborative electronic data platform, a collaborative electronic document to be concurrently presentation on a first user device of a first user and on a second user device of a second user; receiving a request of the first user to insert a table associated with a third-party platform into the collaborative electronic document; causing a list of tables associated with a plurality of third-party platforms to be presented on the first user device, wherein each table has a distinct tabular data schema defined by an application programming interface (API) for a respective third-party platform of the plurality of third-party platforms; receiving, from the first user device, a user selection of a first table from the list of tables; inserting the first table into the collaborative electronic document; and causing the collaborative electronic document with the inserted first table to be concurrently presented on the first user device and on the second user device.

In some aspects, the first table is based on a tabular data schema identifying one or more data types, wherein the tabular data schema is associated with content of one or more sources associated with the third-party platform.

In some aspects, the method further includes: in response to first user input of the first user, adding first new data to the first table, the first user input comprising at least one of a data item or a data object, wherein the data object comprises a plurality of respective data items; and causing the first table with the first new data to be concurrently presented on the first user device and the second user device.

In some aspects, the method further includes receiving a second request of the first user to insert a second table associated with the third-party platform into the collaborative electronic document; causing the list of tables associated with the third-party platform to be presented on the first user device; receiving, from the first user device, a second user selection of the second table from the list of tables; inserting the second table into the collaborative electronic document; and causing the collaborative electronic document with the inserted second table to be concurrently presented on the first user device and on the second user device.

In some aspects, the method further includes receiving a second request of the second user to insert a second table associated with a second third-party platform into the collaborative electronic document; causing a second list of tables associated with the second third-party platform to be presented on the first user device; receiving, from the first user device, a second user selection of the second table from the second list of tables; inserting the second table into the collaborative electronic document; and causing the collaborative electronic document with the inserted second table to be concurrently presented on the first user device and on the second user device.

In some aspects, the method further includes sending, via the API for the third-party platform, a synchronization request to synchronize content of the first table in the collaborative electronic document with the content of one or more sources associated with the third-party platform.

An aspect of the disclosure provides a system including a memory and a processor communicatively coupled to the memory, the processor to perform operations including: providing, by a collaborative electronic data platform, a collaborative electronic document to be concurrently presented on a first user device of a first user and a second user device of a second user; receiving a request of the first user to insert a table associated with a third-party platform of a plurality of third-party platforms into the collaborative electronic document; causing a list of tables associated with the plurality of third-party platforms to be presented on the first user device, wherein each table has a distinct tabular data schema defined by an application programming interface (API) for the third-party platform of the plurality of third-party platforms; receiving from the first user device, a user selection of a first table from the list of tables; inserting the first table into the collaborative electronic document; sending, via the API for the third-party platform, a synchronization request to synchronize content of the table in the collaborative electronic document with content of one or more sources associated with the third-party platform; receiving, via the API, data for the first table and updating the first table using the received data; and causing the collaborative electronic document with the inserted first table to be concurrently presented on the first user device and on the second user device.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIGS. 3A-B depict an example of data tables that can be inserted into an electronic document, in accordance with aspects of the disclosure.

DETAILED DESCRIPTION

Figure 1:
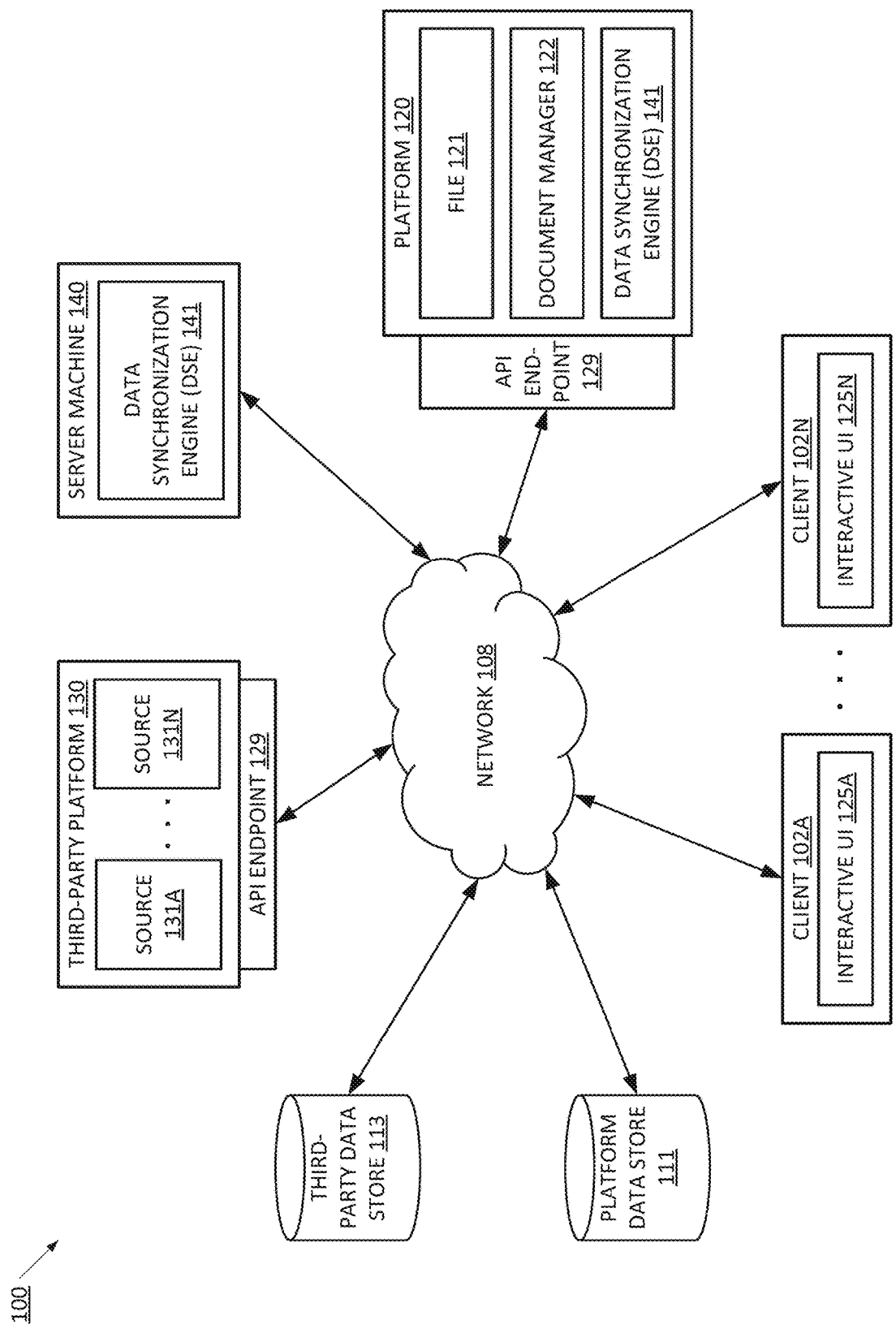
FIG. 1 illustrates an example of a system architecture, in accordance with aspects of the disclosure.

Aspects of the present disclosure relate to automated synchronization of third-party data from within a collaborative electronic data platform. A collaborative electronic data platform can provide a user with tools to access, manipulate and synchronize data (e.g., electronic documents and/or other content) via graphical user interfaces (GUIs) associated with the platform's tools. A collaborative electronic data platform can be provided by an entity such as a company or a similar organization. A user may also use other platforms to store and manipulate data. These platforms, referred to as third party platforms, can be provided by other entities (e.g., other companies). Each third-party platform can have a respective user interface or process for data access, data manipulation or data synchronization. With multiple user interfaces for each respective third-party platform, moving data into or out of a third-party platform can be a manual process.

In particular, a user may need to have data obtained from a third-party platform to be processed on another third-party platform, or have data stored at a native platform to be processed using tools or services of a third-party platform. For example, a team can create on a native platform a spreadsheet with tasks and deadlines, where descriptions of the tasks may be stored on a third-party platform, and may not be easily transferrable to the native platform, requiring manual input of data. In other words, if a third-party platform cannot interpret the native platform resources (or the native platform cannot interpret the third-party resources), automatic or semi-automatic data transfer between the native platform and the third-party platform can be impeded, or dependent on bespoke software integrations between each platform. A lack of—or poor implementation of—an application programming interface (API) can impede automated data transfer between the native platform and the third-party platforms. Additionally, some data types of the native platform can be unrecognizable by the third-party platform (and vice versa), thus requiring customized data interpretation software between the platforms.

Due to these and other difficulties, data transfer between the native platform and the third-party platforms (or between one third-party platform and another third-party platform) often need to be performed manually by a user. The user can often use basic copy and paste functionalities in combination with intrinsic knowledge about the two platforms to migrate, and properly format data between the native platform and the third-party platform. This manual process requiring a user's intimate knowledge of data structures or document types of each platform, can be tedious and time-consuming, and can be prone to error.

Some third-party platforms have developed tools to facilitate data transfers between internal resources of the third-party platform, but these tools can only be used internally within the third-party platform. Some third-party platforms have developed bespoke integrations with other third-party platforms that can facilitate data transfer between each platform. However, these solutions typically require specialized integration software that often is dependent on the uncontrollable functionality and quality of software solutions developed by each third-party platform to integrate with other specific third-party platforms. That is, a software solution that links two third-party platforms often does not directly transfer to linking one of the third-party platforms to another third-party platform, and so each link between respective third-party platforms may need to be independently developed and maintained.

Aspects of the present disclosure address the above noted and other deficiencies by automating the synchronization of third-party data from within a collaborative electronic data platform. The collaborative electronic data platform can be a part of an online (e.g., virtual) platform that provides users or clients with a comprehensive suite of productivity tools, programs, and services. The collaborative electronic data platform can provide a universal application programming interface (API) framework for third-party platform integrations. The API framework can include a configurable tabular data schema. The configurable tabular data schema can define a table (e.g., a series of interconnected columns and rows), including actions that can be performed on, or with the table, and interactions between entries of the table. The collaborative electronic data platform can enable multiple users to update the table concurrently, while the universal API framework can enable the updates from the multiple users (and from third-party platforms) to be synchronized in real-time across respective third-party platforms and the collaborative electronic data platform.

In some embodiments, the configurable tabular data schema can have configurable data types. That is, entries of a table based on the configurable tabular data schema can be of a selectable data type, and not limited to industry standard or "simple" data types such as text data types (e.g., strings, characters, dates, etc.), or number data types (e.g., integers, floating point values, times, etc.). Entries in a table based on the configurable tabular data schema can include non-standard platform-specific or "complex" data types. By way of non-limiting example, a "complex" data type can be a task, which as a "complex" data type illustratively stores multiple "simple" data types of a task title, a task description, a task due date, and a task assignee. In some implementations, "complex" data types can be referred to as "data objects" which encompass multiple ("complex" or "simple") data types. In some implementations, "simple" data types can be referred to as "data items" which encompass a single data type. It should be noted that while data items encompass a single data type, data items can still be unique to a respective third-party platform.

Leveraging the configurable tabular data schema (also referred to as "tabular data schema" or "data schema") of the universal API framework, the collaborative electronic data platform can send synchronization requests to third-party platforms to facilitate updates of entries of a table inserted in a collaborative electronic document of the collaborative electronic data platform. The synchronization requests from the collaborative electronic data platform can request new data from the third-party platforms, including requesting whether previously synchronized data has been modified. The synchronization requests from the collaborative electronic data platform can also cause new data from the table in the collaborative electronic document to be provided to the third-party platforms such that the sources of the synchronized data (e.g., sources of data in the respective third-party platforms) can be updated to reflect the data present in the table of the collaborative electronic document.

Advantages of implementing an automated synchronization of third-party data from within a collaborative electronic data platform include, but are not limited to, facilitating data transfers between platforms (e.g., between multiple third-party platforms or between a native platform and a third-party platform), reducing complexities of current inter-platform data transfer solutions, including a significant reduction in the number of software solutions that need to be maintained (e.g., a universal framework for inter-platform data transfer reduces or eliminates the requirement for bespoke software solutions between respective platforms), reducing errors due to improper manual data transfer, and reducing unwarranted consumption of computing resources needed to enable manual data transfers between respective platforms.

The configurable tabular data schema provides an interface to flexibly map data objects or data items of one platform (e.g., a first third-party platform) to data objects or data items of another platform (e.g., a native platform or a second third-party platform). In some implementations, respective configurable tabular data schemas can be used for tables in a collaborative electronic document to store data objects as multiple data items and a reference data that maps the data item components into the respective data object. In some implementations, non-standard data items can also be stored in a table of the collaborative electronic document as a data item and a reference data that maps the data item into the respective non-standard data item. In this way, data can be quickly and easily synchronized based on respective tabular data schemas for a given table, or a given platform. Additional details regarding the tabular data schema are provided below in reference to FIGS. 3A and 3B.

FIG. 1 illustrates an example of a system 100, in accordance with implementations of the present disclosure. The system 100 includes clients 102A-N, a platform data store 111, a platform 120, a third-party data store 113, a third-party platform 130, and/or server machine 140, each connected to a network 108. In some implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Platform data store 111 can be a persistent storage capable of storing data as well as data structures to tag, organize, and index the platform data. In some implementations, a data item or data object of platform data can correspond to one or more portions of a file 121 for display to a content viewer via a graphical user interface (GUI) on a viewing client 102 (e.g., interactive UI 125). A "data item" herein refers to data of a singular type or simple data (e.g., a number, string, Boolean, etc.). A "data object" herein refers to data encompassing multiple types or complex data. That is, a data object can contain multiple data items. Both a "data item" and a "data object" are examples of a data type. A "data type" herein refers to the format of stored data. Data types can be simple (e.g., a data item) or complex (e.g., a data object). In some implementations, simple data types such as data items can be generic or commonly used data types in the industry (e.g., integers, strings, characters, floating, etc.). The relationship between multiple related data types can be expressed as a tabular data schema. As used herein, "tabular data schema" can refer to an arrangement of data types such as data items or data objects in a tabular format (e.g., rows and columns). In an illustrated example, a tabular data schema can define data types for each column (e.g., a data item or data object) and each row can pertain to a series of related data items or data objects. Additional details regarding the tabular data schema are described below with reference to FIG. 3.

In some implementations, complex data types such as data objects can be custom data containers that pertain to a respective service or platform (e.g., third-party platform 130). For example, a data object of a third-party platform 130 can be different than a data object of another third-party platform. Platform data store 111 can be hosted by one or more storage devices, such as main memory, magnetic or optical storage based disks, tapes or hard drives, network added storage (NAS), storage area network (SAN), and so forth. In some implementations, platform data store 111 can be a network-attached file server, while in other implementations the platform data store 111 can be some other type of persistent storage such as an object-oriented database, a relational database, and so forth, that may be hosted by platform 120 or one or more different machines coupled to the platform 120 via network 108.

Third-party data store 113 can be a persistent storage capable of storing data as well as data structures to tag, organize, and index the platform data. In some implementations, a data item, or data object of third-party data store 113 can correspond to one or more portions of a file 121. That is, data items, or data objects of third-party data store 113 be synchronized with data items or data objects of platform data store 111 by using data synchronization engine ("DSE") 141 as described herein. Third-party data store 113 can be hosted by one or more storage devices, such as main memory, magnetic or optical storage based disks, tapes or hard drives, NAS, SAN, and so forth. In some implementations, third-party data store 113 can be a network-attached file server, while in other implementations the third-party data store 113 can be some other type of persistent storage such as an object-oriented database, a relational database, and so forth, that may be hosted by third-party platform 130 or one or more different machines coupled to the platform 120 via network 108.

Clients 102A-N can each include computing devices such as personal computers (PCs), laptops, mobile phones, smart phones, tablet computers, netbook computers, network-connected televisions, etc. In some implementations, clients 102A-N may also be referred to as "user devices." Each client 102 can include a content viewer. In some implementations, a content viewer can be an application that provides a user interface (UI) for users to view or upload a file 121 (e.g., images, video items, web pages, documents, etc.). According to aspects of the disclosure, the content viewer can be a platform application for viewing a file 121 (e.g., a collaborative electronic document). In the illustrated example, the content viewer is shown as interactive user interface (UI) 125A-N. In some implementations the interactive UI 125 can be an application that provides a GUI for users to view, create, or edit content of a file 121, such as an electronic document file, an electronic message file, an image file, a video file, etc. For example, the interactive UI 125 can be a web browser that can access, retrieve, present, and/or navigate files 121 (e.g., web pages such as Hyper Text Markup Language (HTML) pages, digital content items, etc.) served by a web server. The interactive UI 125 can render, display, and/or present the content to a user. The interactive UI 125 can also include an embedded media player (e.g., a Flash® player or an HTML5 player) that is embedded in a web page (e.g., a web page that may provide information about a product sold by an online merchant). In one example, the interactive UI 125 can be a standalone application (e.g., a mobile application or app) that allows users to view, edit, and/or create digital content items (e.g., electronic documents, electronic messages, digital video items, digital images, electronic books, etc.). According to aspects of the disclosure, the interactive UI 125 can be an electronic document platform application for users to record, edit, and/or upload content for files 121 (e.g., electronic documents) on platform 120. As such, the interactive UI 125 can be provided to viewing client devices 102A-N by platform 120. In one example, the interactive UI 125 can be embedded in web pages provided by the platform 120. Additional details regarding the interactive UI 125 are described below with reference to FIGS. 2A-3.

Platform 120 and/or server machine 140 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide users of clients 102A-N with access to a file 121 (e.g., an electronic document, an e-mail message, etc.) and/or provide the file 121 to users of clients 102A-N. Platform 120 can also include back-end software that can be used to provide users of clients 102A-N with access to files 121. Platform 120 can also include a website (e.g., a webpage) or application back-end software that can be used to provide a user with access to files 121.

Platform 120 can include one or more files 121. Platform 120 can provide users of clients 102A-N with access to files 121. In some implementations, platform 120 can be an electronic document platform, such as a collaborative electronic data platform. A file 121 can be an electronic document. An electronic document can include content such as one or more text strings, images, videos, graphics, etc., and one or more data items or data objects arranged in a tabular format. In some implementations, the one or more data items or data objects can be stored in the electronic document as a table of values. In some implementations, the electronic document can be or can correspond to a text document, slide presentation document, a spreadsheet document, and so forth.

Platform 120 can be configured to enable a user to create and/or edit an electronic document. The collaborative electronic data platform (illustratively, platform 120) can allow a user to create, edit (e.g., collaboratively with other users), access or share with other users an electronic document (e.g., file 121) stored at platform data store 111. The collaborative electronic data platform can allow a user to create, edit, or access electronic documents that include data items or data objects pertaining to a platform or users of client devices outside of the collaborative electronic data platform (e.g., third-party data stores 113 or third-party platforms 130). In some implementations, platform 120 can facilitate the access of file 121, or information about file 121 by a client 102 through interactive UI 125. For example, a client 102 associated with a user of platform 120 can transmit a request to access an electronic document (e.g., a text document) via the interactive UI 125. In another example, a client 102A associated with a user of platform 120 can transmit a request to platform 120 to create a text document based on a text document template associated with platform 120 that includes one or more data items or data objects (e.g., in an embedded table). Platform 120 can generate a file 121 associated with the text document based on the text document template and/or a selected table template (e.g., a tabular data schema) and can provide the user with access to the text document through the interactive UI 125. Additional details regarding the interactive UI 125 are described below with reference to FIGS. 2A-3.

Platform 120 can include a document manager 122. Document manager 122 can be configured to manage access to a particular document by one or more users of platform 120 (e.g., users of clients 102A-N). For example, a client 102 can provide a request to platform 120 for a particular electronic document (e.g., a file 121). Document manager 122 can identify the file 121 (e.g., stored in platform data store 111) and can determine whether a user associated with the client 102 is authorized to access the requested file 121. Responsive to determining that the user is authorized to access the requested file 121, document manager 122 can provide the client 102 with access to the file 121. The client 102 can provide the user with access to the file via the interactive UI 125, as described above. As indicated above, a user can create and/or edit an electronic document (e.g., of file 121) via the interactive UI 125 of a client 102 associated with the user. Document manager 122 can obtain the file 121 associated with the requested electronic document, as described above, and platform 120 can provide the user with access to the electronic document via the interactive UI 125. The user can edit one or more portions of the electronic document via the interactive UI 125 and the platform 120 can update the file 121 associated with the electronic document to include the edits to the one or more portions. The electronic document can be a collaborative document that, in some implementations, can be edited (e.g., concurrently) by one or more users of platform 120. In some implementations, the document manager 122 can be part of the DSE 141.

Platform 120 can include a data synchronization engine ("DSE") 141. As indicated above, a file 121 (e.g., electronic document) can include content. In some embodiments, data from the third-party data store 113 can be embedded within the content of the electronic document, such as in values in an embedded table or any other data structure having a tabular format. For example, a portion (e.g., one or more entries) of the third-party data store 113 can be embedded above, below, or within the one or more portions of content such that the embedded portion of the data structure is presented as a respective content object of the electronic document. DSE 141 can enable the user to provide and/or modify the portion of the content from sources 131A-N of third-party platform 130 (e.g., data stored at a third-party data store, content of a website provided by third-party platform 130, etc.) embedded within the content of the electronic document. For example, using the interactive UI 125, the user can update an entry of a table of values in an electronic document storing data items or data objects pertaining to the third-party platform 130 by interacting with one or more GUI elements associated with one or more fields of an embedded table. Updating the values of one or more data items or data objects can include a user adding an additional entry, or series of entries to the table of the electronic document via the interactive UI 125. For example, the user can edit the embedded portion of the file 121 that pertains to data of the third-party platform 130 (e.g., data stored at third-party data store 113) by adding entries to—or changing entries in—a table of values in the electronic document (e.g., a value a particular data type). In some implementations, a user of a client 102 can use an interactive UI 125 to perform duplication and transfer operations of table entries (e.g., copy/paste actions).

DSE 141 can manage the values of data items and data objects pertaining to sources 131A-N of a third-party platform 130. Through API endpoint 129, DSE 141 can update tables in file 121 that contain data items or data objects pertaining to sources 131A-N of third-party platform 130. DSE 141 enables, through API endpoints 129, an API for third-party platforms 130 to send and receive data items and data objects with files 121 of platform 120. In some embodiments, DSE 141 can detect updates made to the table embedded within the contents of the electronic document. In an illustrative example, DSE 141 can detect that a user (e.g., a requester) has added one or more entries to a portion of a table embedded within an electronic document (e.g., via the interactive UI 125). Responsive to detecting that the user has added one or more entries to the embedded portion of the table, DSE 141 can update the table of file 121 associated with the electronic document based on the entry the user has added to the portion of the table embedded within the contents of the electronic document. In some implementations, DSE 141 can send a synchronization request (e.g., send updated data to third-party platform 130, and request updated data from third-party platform 130) when a row of the table embedded in the file 121 is completed. That is, when a value for each column of a row of data types (e.g., data objects, data items, etc.) has been completed, DSE 141 can send a synchronization request to third-party platform 130. Further details regarding the DSE 141 are provided herein.

As described above, API endpoints 129 allow third-party platform 130 to communicate with platform 120 through network 108 via an API (e.g., DSE 141 can use the API to synchronize values of data items or data objects). In some embodiments, platform 120 can include multiple API endpoints 129 that can expose services, functionality, or content of the platform 120 to one or more third-party platforms 130. In some embodiments, an API endpoint 129 can be one end of a communication channel, where the other end can be another system, such as a third-party platform 130, or a device associated with the third-party platform 130 (not illustrated). In some embodiments, the API endpoint 129 can include or be accessed using a resource locator, such a universal resource locator (URL), of a server or service. The API endpoint 129 can receive requests from other systems, and in some cases, return a response with information responsive to the request. In some embodiments, HTTP or HTTPS methods can be used to communicate to and from the API endpoint 129.

In some embodiments, the API endpoint 129 can function as a computer interface through which communication requests, such as access requests, are received and/or created. The platform 120 may include one or more types of API endpoints. In some embodiments, the API endpoint 129 can include an access API whereby external entities or systems can request access to files 121 or values of table entries in files 121 of platform 120. The access API may be used to programmatically obtain data items associated with a request for data items. In some embodiments, the API is implemented in connection with a multitenant communication service wherein different accounts (e.g., authenticated entities of third-party platform 130) can submit independent requests. These requests made through the API can be managed with consideration of other requests made within an account and/or across multiple accounts on the communication service.

In some embodiments, the API of the API endpoint 129 may be any suitable type of API such as a REST (Representational State Transfer) API, a GraphQL API, a SOAP (Simple Object Access Protocol) API, and/or any suitable type of API. In some embodiments, the platform 120 can expose through the API, a set of API resources which when addressed may be used for requesting different actions, inspecting state or data, and/or otherwise interacting with the platform 120. In some embodiments, a REST API and/or another type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described for purposes of illustration rather than limitation. The disclosure should not be interpreted as being limited to the HTTP protocol. HTTP requests (or any suitable request communication) to the platform 120 may observe the principles of a RESTful design or the protocol of the type of API. RESTful is understood in this document to describe a Representational State Transfer architecture. The RESTful HTTP requests may be stateless, thus each message communicated contains all necessary information for processing the request and generating a response. The API service can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

In some embodiments, the API endpoint 129 can include a data item request instruction module (e.g., access request module) that can be called within an application, script, or other computer instruction execution. For example, a computing platform may support the execution of a set of program instructions where at least one instruction within a script or other application logic is used in specifying an access request and communicating that request. In some embodiments, the API endpoint 129 can include a console, administrator interface, or other suitable type of user interface. Such a user-facing interface can be a graphical user interface (GUI). Such a user interface may additionally work in connection with a programmatic interface.

The API can pre-define a table schema for data items or data objects of the third-party platform 130 (e.g., data items or data objects stored in third-party data store 113). The API can enable a user interface to be presentable to users of clients 102A-N through respective interactive UIs 125A-N. The user interface can allow a user to select a table configuration from a set of table configurations (e.g., predefined tabular data schema) that corresponds to the third-party platform 130. In some implementations, the interactive UI 125 can allow a user to configure a custom table configuration based on the data items and data objects to be stored in the table of file 121. Each data item or data object can pertain to a source 131A-N of the third-party platform 130. In some implementations, multiple third-party platforms can use one or more of the same tabular data schemas. Additional details regarding table configurations and the interactive UI 125 are described herein with reference to FIGS. 2A-3.

Once a tabular data schema pertaining to the third-party platform 130 is defined via the API, a table synchronization option can be activated for a table in an electronic document pertaining to data of the third-party platform 130. DSE 141 can, through the API, cause the table in the electronic document (e.g., file 121) to be periodically updated (e.g., synchronized) with data from sources 131A-N of third-party platform 130. In some implementations, DSE 141 can cause values of entries in the table of file 121 to be synchronized to third-party platform 130 based on changes made to the table in the file 121. During synchronization, DSE 141 can receive new data values from sources 131A-N of third-party platform 130 or transmit new table entry values of file 121 to sources 131A-N of third-party platform 130. For example, a row of entries can be added to the table in file 121 and subsequently the values of the entries in the newly added row can be sent to respective sources 131A-N of third-party platform 130 as either new respective entries, or updated entries. In some implementations, a table in an electronic document can include entries pertaining to more than one third-party platform 130. DSE 141 can cause entries pertaining to multiple third-party platforms 130 to be synchronized with respective data items and data objects of the multiple third-party platforms. Additional details regarding table configurations and synchronizations are described herein with reference to FIGS. 3-4.

In some implementations, some, or all of the features of the API can be universal features provided, configured, and enabled by platform 120 (e.g., through API endpoints 129). That is, platform 120 can provide a configurable framework for third-party platforms 130 to define various tabular data schemas. In some implementations, each API for each third-party platform can be distinct. In some implementations, tabular data schemas of the third-party platform 130 can be predefined by administrator users of the third-party platform 130. When selecting or configuring a table in an electronic document for entries pertaining to data items or data objects of a third-party platform 130, specific sources 131A-N can be identified and linked to the table. In some implementations, the sources 131A-N for a predefined table can be identified and linked by an administrator user of the third-party platform 130. In some implementations, the sources 131A-N for a predefined or configurable table can be identified and linked by a user of platform 120 (e.g., a respective user of a client 102). Users of platform 120 (e.g., users of clients 102A-N) can activate the table synchronization option for files 121 of platform 120. In some implementations, each table of each electronic document (e.g., file 121) of platform 120 can have a distinct table synchronization option. In some implementations, all tables in files 121 pertaining to a third-party platform 130 can be linked to a table synchronization option pertaining to the third-party platform 130. That is, synchronization of all table entry values pertaining to a third-party platform 130 can be either activated or deactivated.

In some implementations, third-party platform 130 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to store data items or data objects pertaining to the third-party platform in one or more sources 131A-N. As described above, data items or data objects can be stored in third-party data store 113, and made available through third-party platform 130 and/or sources of third-party platform 131A-N via a configurable API of API endpoint 129. As described above, third-party platform 130 can include sources 131A-N. Data items and data objects stored at third-party data store 113 can come from multiple sources 131A-N. For example, data items in a table at source 131A can be synchronized with values of data items in a table of file 121, and data objects in a table at source 131N can be synchronized with values of data objects in the table of file 121 simultaneously. In some implementations, third-party platform can, through the API, send a synchronization request to platform 120. In such implementations, DSE 141 can process the synchronization request as it pertains to values of entries in respective tables of files 121.

Server machine 140 can include the DSE 141 that manages synchronization communications (e.g., receives and sends synchronization requests to/from third-party platform 130). In some implementations, DSE 141 can manage synchronization of values of data items or data objects between platform data store 111 and third-party data store 113 through API endpoints 129 of platform 120 and third-party platform 130 respectively. DSE 141 can generate a mapping between data items or data objects of third-party data store 113 and respective data items or data objects of platform data store 111. In some embodiments, DSE 141 can store these generated mappings in a metadata table on platform data store 111. In some embodiments, an API, or respective APIs can determine mappings between data items or data objects of third-party data store 113 and respective data items or data objects of platform data store 111, which mappings can be received and stored by DSE 141. As described above, in some implementations, mappings between data items or data objects of third-party platforms 130 and respective data items or data objects of platform 120 can be predefined (based on the API or respective API for the third-party platform 130), or can be configured by a user of client 102 when inserting a table with a tabular data schema pertaining to data items or data objects of third-party platform 130.

In general, functions described in implementations as being performed by platform 120, third-party platform 130, and/or server machine 140 can also be performed on the clients 102A-N in other implementations, if appropriate. In addition, the functionality attributed to a specific component can be performed by different or multiple components operating together. Platform 120 can also be accessed as a service provided to other systems or devices through appropriate application programming interfaces, and thus is not limited to use in websites.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a specific location of a user cannot be determined. Thus, the user can have control over what information is collected about the user, how that information is used, and what information is provided to the user.

Figures 2A, 2B:
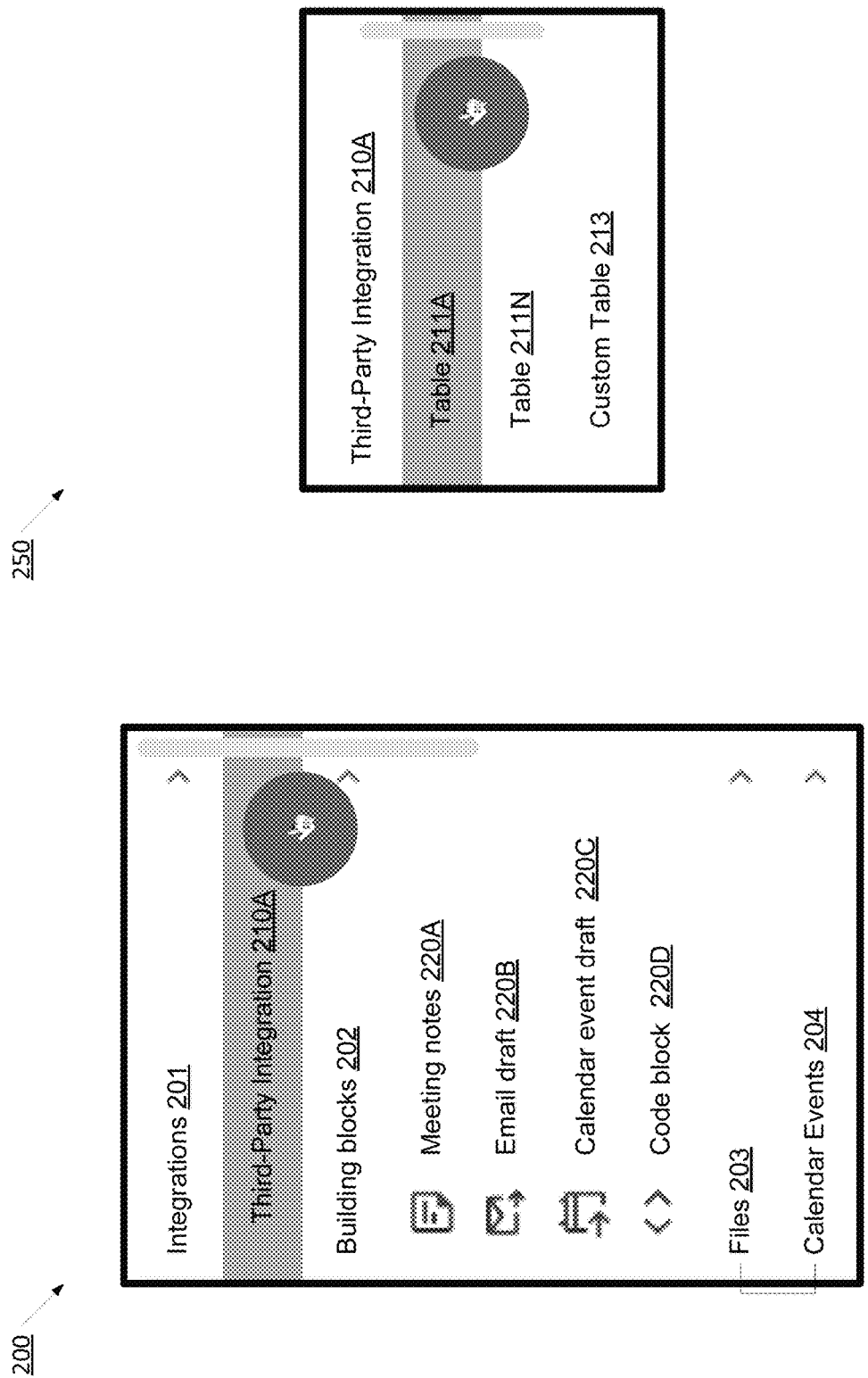
FIGS. 2A-B depict an example of a drop-down menu and an example of a secondary menu of a user interface to be displayed to a user of a client device, in accordance with aspects of the disclosure.

FIGS. 2A-B depict an example of a drop-down menu 200 and an example of a secondary menu 250 of a user interface to be displayed to a user of a client device, in accordance with aspects of the disclosure. Drop-down menu 200 can be a part of an interactive user interface (e.g., interactive UI 125 described with reference to FIG. 1). Drop-down menu 200 can include various options. In the illustrated example, drop-down menu 200 includes integrations 201, building blocks 202, files 203, and calendar events 204. Integrations 201 can include third-party integration 210A. While not illustrated, integrations 201 can include additional third-party integrations 210B-N. Building blocks 202 can include meeting notes 220A, email draft 220B, calendar event draft 220C, and code block 220D. Building blocks 202, files 203, and calendar events 204 are illustrative examples of additional tools that can be used to insert data into an electronic document, export data from the electronic document, or otherwise integrate the electronic document into a collaborative electronic data platform (e.g., platform 120 as described with reference to FIG. 1).

When third-party integration 210A is selected (e.g., by selecting the UI element with a cursor, or by hovering the cursor over the UI element), secondary menu 250 can appear with a list of predefined tables, tables 211A-N, as well as custom table 213. Each table 211A-N can have a distinct, predefined tabular data schema. The custom table 213 can have a generic tabular data schema that might pertain to various data types of the respective third-party (e.g., of the third-party integration 210A) but allows the user to configure a custom table. When a table 211A-N or custom table 213 is selected from the third-party integration 210A, the table synchronization option can be activated. In some implementations, selecting third-party integration 210A does not cause the secondary menu 250 to appear. In such implementations, selecting third-party integration 210A can activate the table synchronization option, and the user can configure the table to be synchronized with other UI tools (not shown).

FIGS. 3A-B depict an example of data tables that can be inserted into an electronic document, in accordance with aspects of the disclosure. Table 300 has a data schema defined by the columns of table 300, and data type 303A-N. The data schema of table 300 includes a first column of primary data type 301. The primary data type 301 can indicate a primary purpose of the table. In an illustrative example, the primary data type 301 can be a "task." The data schema of table 300 includes additional columns that store data of data type 303A-N associated with data of primary data type 301 (e.g., also referred to herein as "primary data"). In some implementations, data of data type 303A-N can be associated with data of primary data type 301 (e.g., primary data) when the primary data and the data of data type 303A-N are from the same or similar sources (e.g., the same document on a third-party platform, or from the same third-party platform). For example, a table of data in a document stored on a third-party platform could be re-created as table 300, using data types 303A-N. As described above, data types 303A-N can be different types of data, including data items and/or data objects.

In an illustrative example, the primary data type 301 can be a "task", and the first column can be labeled as "Task Titles." The second column can correspond to a first data type (e.g., data type 303A), and can be labeled "Task Descriptions," and the third column can correspond to a second data type (e.g., data type 303N), and can be labeled "Task Due Date." In some embodiments, the first data type 303A (e.g., "Task Descriptions") can be a custom data type, or generic data type, such as a string or text data type. In some embodiments, the second data type 303N (e.g., "Task Due Date") can be a custom data type, or a generic data type, such as a string or text data type, a number data type, or a date data type.

In FIG. 3B, table 350 is a specific implementation of table 300. Table 350 includes a first column of a data object 351. Table 300 has a data schema defined by the columns of data object 351, and data items 353A-N. Data object 351 can be a complex data type that includes multiple data items. The data schema of table 350 includes additional columns that store data items 353A-N that are included in data object 351. In some implementations, the first column (e.g., data object 351) can store a mapping between the subsequent data items 353A-N indicating how to combine the data items 353A-N back into the data object 351. In some implementations, the first column can store the data object 351 in its entirety in the first column, and then store data items 353A-N as components of the data object 351 in subsequent columns. In some implementations, the first column (e.g., data object 351) can be hidden from the view of the user (e.g., not displayed in the electronic document).

For example, for a table of tasks, the first column can be labeled as "Tasks" in place of data object 351. The data object 351 of "Tasks" can include the data items of "Task Title" (e.g., data item 353A), Task Description" (e.g., data item 353B), and "Task Due Date" (e.g., data item 353N). "Task Titles" can be a custom data type, or generic data type, such as a string or text data type. "Task Descriptions" can be a custom data type, or generic data type, such as a string or text data type. "Task Due Date" can be a custom data type, or a generic data type, such as a string or text data type, a number data type, or a date data type. As described above, in some implementations, entries in the first column, data object 351 can be used as a map to combine data items 353A-N.

Returning to FIG. 3A, in an illustrative example, a table 300 in an electronic document (e.g., file 121 described with reference to FIG. 1) can be predefined to store the values of "Project," "Task," and "Assignee" pertaining to a respective third-party platform. The "project" data type can be a custom data type (e.g., a primary data type 301) that pertains to the third-party platform, enabling a user to select a value from a drop-down list of values. The "task" data type can be another custom data type that includes multiple data items (e.g., a data object). The task data type can include a "task title," "task description," and "task due date." As a complex data type or data object, the "task" can be stored in the table as a "task" (e.g., the table entry can store and present the task title, description, and due date) or the "task" can be stored as individual data items that make up the complex data type (e.g., as the data items "task title," "task description," and "task due date"). The data type "assignee" can be a simple data type (e.g., data item) such as a text data type or string, with the "assignee" identifier. One predefined tabular data schema can include columns for "project," "task," and "assignee" (e.g., primary data type 301, data type 303A, data type 303N, etc.) that can be populated from a third-party platform. Another predefined tabular data scheme can include columns for "project," "task title," "task description," "task due date," and "assignee" (e.g., data object 351, data item 353A, data item 353N, etc.). Thus, the API can predefine various tabular data schemas, including tabular data schemas that separate complex data types (e.g., data objects) into individual simple data types (e.g., data items).

In some implementations, multiple third-party platforms can use one or more of the same tabular data schemas for respective tables (e.g., a table 300) in electronic documents. In some implementations, tabular data schemas pertaining to a third-party platform can be modular tabular data schema. That is, a third-party platform can define each of the various data types (e.g., data objects or data items) that are stored at third-party platforms in a primary tabular data schema, and define secondary tabular data schemas for common configurations of the various data types. In an illustrative example, a third-party platform has data types including "data item A," "data item B," "data item C," "data object X" including "data item A" and "data item B," and "data object Y" including "data item B" and "data item C". The primary tabular data schema can define each of data items "A," "B," and "C," and data objects "X" and "Y." One example of a secondary tabular data schema might define a table of data items "A," "B," and "C" (with "data object X," and "data item C" as inputs). Another example of a secondary tabular data schema might define a table of "data item A," and "data object Y" (with data items "A," "B," and "C" as inputs).

In some implementations, table 300 in an electronic document can be based on a tabular data schema that includes entries pertaining to more than one third-party platform. For example, table 300 can include entries for data types "A," and "B" from third-party platform "X" and entries for data types "C" and "D" from third-party platform "Y." In some implementations, a single entry in the table 300 can pertain to multiple third-party platforms. For example, the table 300 can include entries for data types "A," and "B" from third-party platform "X," and entries for data types "A" and "C" from third-party platform "Y." That is, the table 300 can include entries for data types "A," "B", and "C," which can be synchronized with values of entries of data type "A" of third-party platform "X" and third-party platform "Y," values of entries of data type "B" of third-party platform "X," and values of entries of data type "C" with third-party platform "Y." In this way, data from the electronic document in table 300 can be synchronized across multiple third-party platforms, including platforms referencing the same entry of the table 300.

Figure 4:
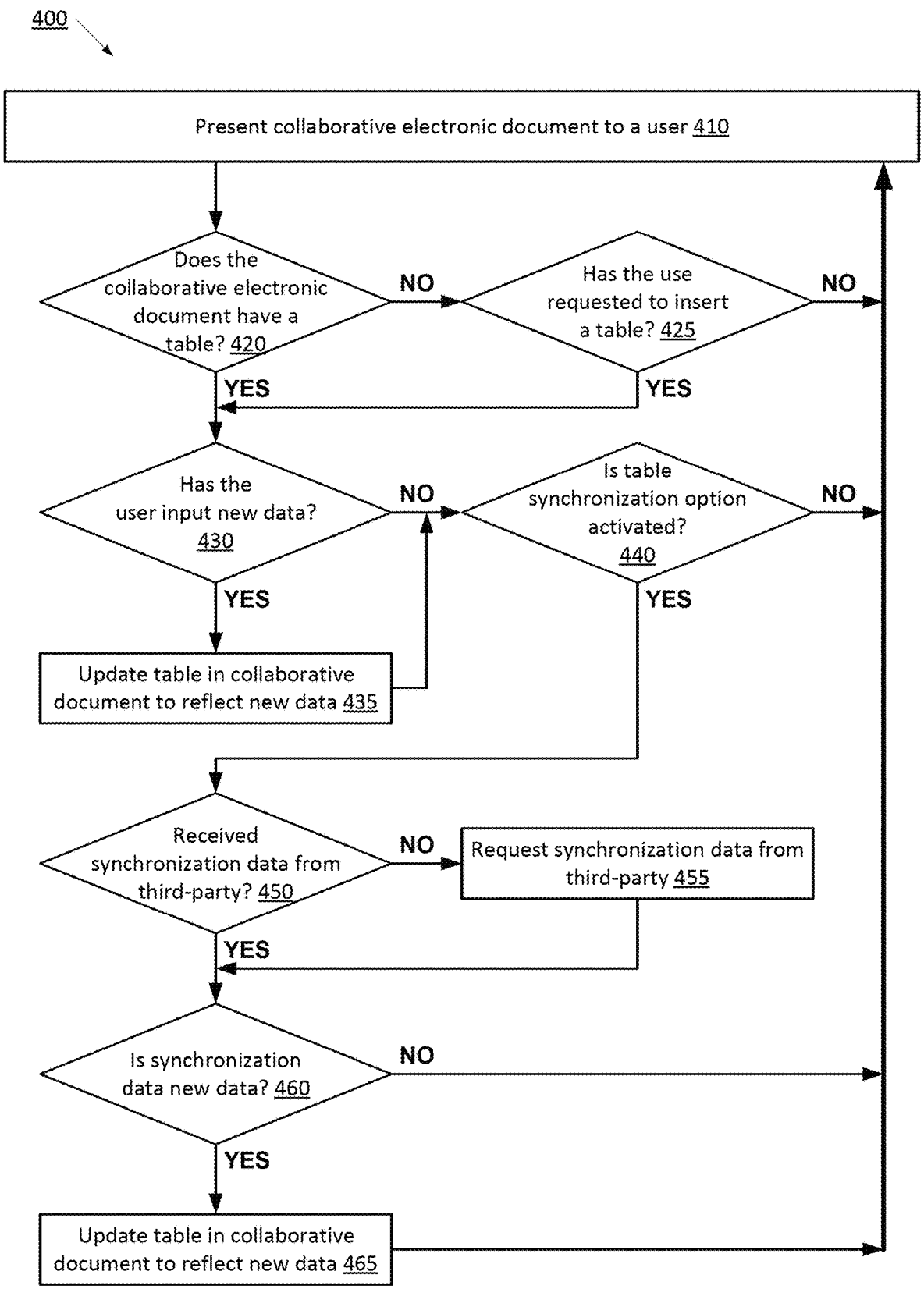
FIG. 4 depicts a flow diagram of an example method for an automated synchronization of third-party data from within a collaborative electronic data platform, in accordance with aspects of the disclosure.

FIG. 4 depicts a flow diagram of an example of a method 400 for an automated synchronization of third-party data from within a collaborative electronic data platform, in accordance with aspects of the disclosure. Method 400 can be performed by processing logic that can include hardware (circuitry, dedicated logic, etc.), software (e.g., instructions run on a processing device), or a combination thereof. In one implementation, some, or all of the operations of method 400 can be performed by one or more components of system 100 of FIG. 1. In some implementations, some, or all of the operations of method 400 can be performed by DSE 141 as described above.

At operation 410, processing logic performing the method 400 (e.g., DSE 141) provides a collaborative electronic document for presentation to a user. The collaborative electronic document can be presented through a user interface of a client device (e.g., interactive UI 125 of client 102 as described with reference to FIG. 1). The user interface of the client device can accept user inputs to create, add, delete, or otherwise change the collaborative electronic document. The user interface of the client device can allow the user to perform tabular data structure actions such as copying and pasting one or more entries of the table (e.g., table cells).

At operation 420, processing logic determines whether the collaborative electronic document includes a table (e.g., table 300 as described with reference to FIG. 3). The collaborative electronic document can include multiple tables with entries sourced from multiple third-party platforms. In some implementations, a single table can include entries sourced from multiple third-party platforms. If the collaborative electronic document includes a table, processing logic can proceed to operation 430.

At operation 425, responsive to determining the collaborative electronic document does not include a table, processing logic determines whether a user accessing the collaborative electronic document has requested to insert a table. The user can be presented with a user interface element for selecting and inserting a pre-defined table based on one or more tabular data schemas (such as drop-down menu 200 described with reference to FIG. 2B). In some implementations, the user can request to insert a configurable table that can be based on a customized tabular data schema for a third-party platform (as customized by the user inserting the configurable table). Responsive to determining a user has not inserted the table, processing logic returns to operation 410. In some implementations, if the table synchronization option is not activated, processing logic will not process synchronization requests. In some implementations, if the table synchronization option is not activated, processing logic will not send or receive synchronization requests.

At operation 430, responsive to detecting a table is present in the collaborative electronic document, processing logic determines whether a user has requested to input new data into the table. If the user has not requested to input new data into the table, processing logic can proceed to operation 440.

At operation 435, responsive to determining that a user has requested to input data into the table, processing logic updates the table in the collaborative electronic document to reflect the new data. Processing logic can cause the updated table to be available for presentation to users of the collaborative electronic data platform (e.g., operation 410 can be performed continuously, or in real-time as operations 420-465 are performed).

At operation 440, responsive to determining that a user has not requested to input new data into the table, processing logic determines whether the table synchronization option is activated. If the table synchronization option has been activated, processing logic can send a synchronization request to the third-party platform(s) associated with the table based on the user-input data. The synchronization request can include new data and can be provided to the third-party platforms through an API that facilitates updating the third-party platform data, as described herein. Responsive to determining the table synchronization option is not activated, processing logic returns to operation 410.

At operation 450, responsive to determining the table synchronization option is activated, processing logic determines whether synchronization data has been received from a third-party platform. In some implementations, processing logic can receive synchronization data from a third-party platform regardless of whether the table synchronization option is activated. In some embodiments, if the table synchronization option is not activated, processing logic will not process the received synchronization data. In some implementations, processing logic will not receive or send table synchronization requests while the table synchronization option is deactivated. In some implementations, third-party platforms can send synchronization requests with synchronization data when the collaborative electronic document is not being viewed by a user of a client (e.g., the table in the collaborative electronic document can be updated in the background). In some implementations, third-party platforms can send synchronization requests at regular time intervals. In some implementations, third-party platforms can send synchronization requests in response to an update to the data store that stores data pertaining to the table in the collaborative electronic document. In some implementations, third-party platforms can send synchronization requests in response to a synchronization request sent by the collaborative electronic data platform.

At operation 455, responsive to determining synchronization data has not been received from the third-party platform, processing logic requests synchronization data from the third-party platform. In some implementations, processing logic can send synchronization requests with synchronization data when the collaborative electronic document is not being viewed by a user of a client (e.g., the table in the collaborative electronic document can be updated in the background). In some implementations, processing logic can send synchronization requests at regular time intervals. In some implementations, processing logic can send synchronization requests in response to an update to the data store that stores data pertaining to the table in the collaborative electronic document (e.g., if a user changes entries in the table of the electronic document). In some implementations, processing logic can send synchronization requests in response to a synchronization request sent by a third-party platform.

At operation 460, responsive to receiving synchronization data from the third-party platform, processing logic determines whether the synchronization data is new data. Synchronization requests can be sent and received for various reasons, and each received synchronization request does not necessarily include new data. Data in the synchronization request (e.g., synchronization data) can be compared with data in the table. If there is a difference, processing logic can determine which data should be corrected. The method for determining which revision of data should be selected can include, for example, comparing version histories, time stamps, and other related factors. If processing logic determines the received synchronization data is new data, processing logic can proceed to operation 465. Responsive to determining the synchronization data is not new data, processing logic returns to operation 410.

At operation 465, responsive to determining the synchronization data is new data, processing logic updates the table in the collaborative electronic document to reflect the new data. After processing logic has updated the table in the collaborative electronic document, processing logic can proceed to operation 410.

It should be noted that some or all of operations 410-465 can be performed simultaneously and in real-time. That is, operation 410 can be performed constantly, in addition to one of operations 420-465. In particular, in some implementations, operation 435 and operation 465 can be performed simultaneously. That is, processing logic can wait for user inputs to the table and synchronization data changes and can update the table to reflect both user inputs and synchronization data changes in the same update operation.

Figure 5:
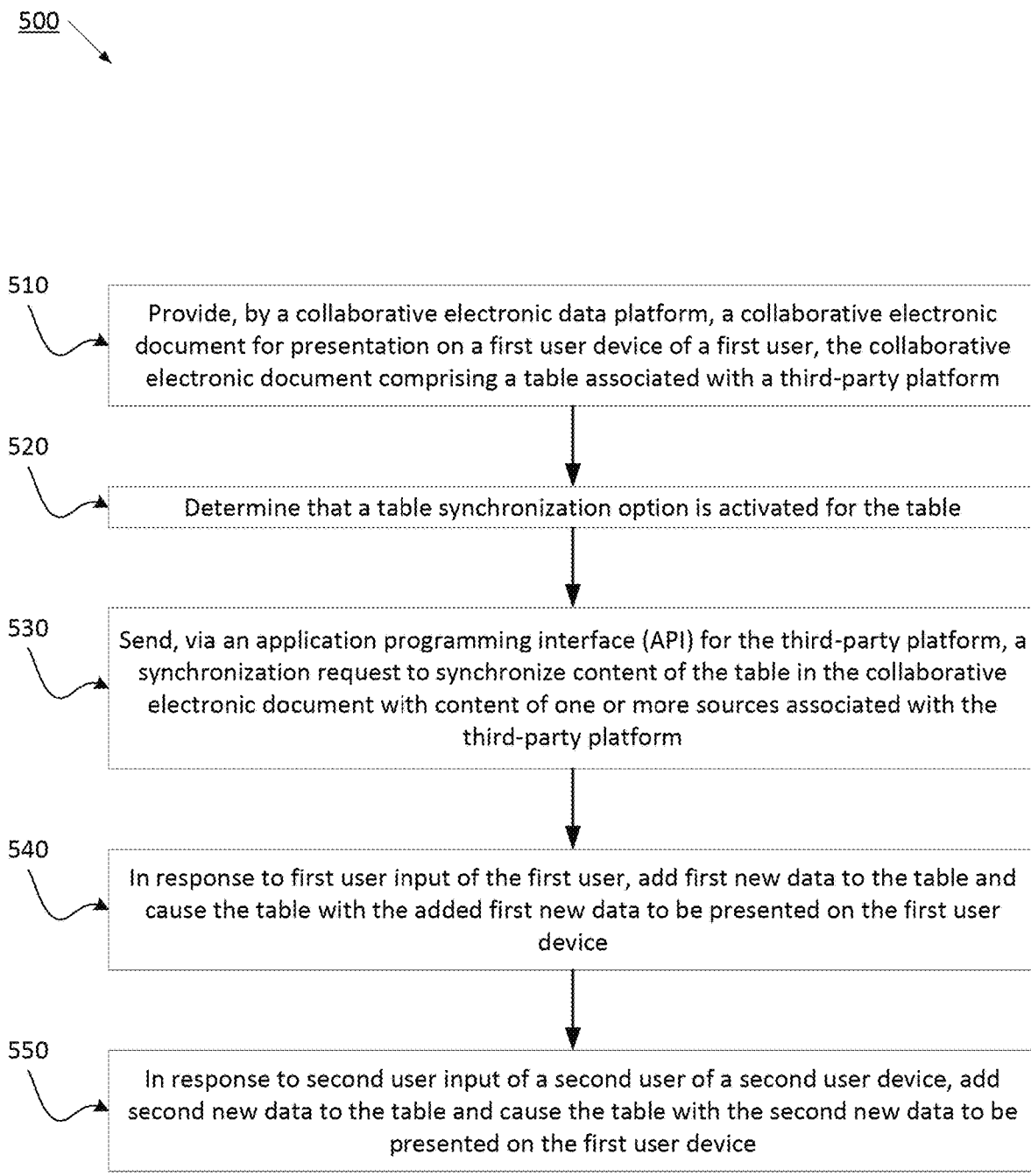
FIG. 5 depicts a flow diagram of an example method for an automated synchronization of third-party data from within a collaborative electronic data platform, in accordance with aspects of the disclosure.

FIG. 5 depicts a flow diagram of an example of a method 500 for an automated synchronization of third-party data from within a collaborative electronic data platform, in accordance with aspects of the disclosure. Method 500 can be performed by processing logic that can include hardware (circuitry, dedicated logic, etc.), software (e.g., instructions run on a processing device), or a combination thereof. In one implementation, some, or all of the operations of method 500 can be performed by one or more components of system 100 of FIG. 1. In some implementations, some, or all of the operations of method 500 can be performed by DSE 141 as described above.

At operation 510, processing logic performing the method 500 (e.g., DSE 141) provides, by a collaborative electronic data platform, a collaborative electronic document for presentation on a first user device of a first user, the collaborative electronic document comprising a table associated with a third-party platform. In some implementations, entries in the table are based on a tabular data schema identifying one or more data types. The tabular data schema can be associated with the content of the one or more sources hosted by the third-party platform. In some implementations, the tabular data schema can be configured by the third-party platform (e.g., by an administrative user or developer of the third-party platform). In some implementations, the one or more data types can include at least one of a data item and a data object. Respective data objects can include multiple respective data items. In some implementations, the data object can be added to the table of the collaborative electronic document as the multiple data item components.

At operation 520, processing logic determines that a table synchronization option is activated for the table.

At operation 530, processing logic sends, via an application programming interface (API) for the third-party platform, a synchronization request to synchronize content of the table in the collaborative electronic document with content of one or more sources hosted by the third-party platform. In some implementations, a universal API can be configured to accept and send synchronization requests. In some implementations, the universal API can include a framework for tabular data schemas of various third-party platforms and associated tables. In some implementations, processing logic can present a universal framework for third-party APIs to interact with the collaborative electronic data platform. That is, each third-party API can be distinct, but use the same library of underlying functions. In some implementations, tabular data schemas can be unique to each third-party platform. That is, each tabular data schema associated with a table can be distinct from other tabular data schemas for a third-party platform, and tabular data schemas for one third-party platform might not necessarily be configured to function as tabular data schemas for another third-party platform, despite including the same or similar data types in the same or similar formatting. In some implementations, universal tabular data schemas are used by the universal or multi-APIs when possible. That is, for tables with the same or similar data types in the same or similar formatting, a universal tabular data schema can be used to extract and convert the contents of data from third-party platforms to entries of the table in the collaborative electronic document.

At operation 540, in response to first user input of the first user, processing logic adds first new data to the table and cause the table with the added first new data to be presented on the first user device. In some implementations, in response to the first user input, processing logic can send a synchronization request to the third-party associated with the table of the collaborative electronic document. The synchronization request from the collaborative electronic data platform (e.g., the synchronization request sent by processing logic) can include at least a portion of content of the table of the collaborative electronic document. In some implementations, the user input can include a data item or a data object. As described above, the data object can include multiple data items and a mapping, or reference data that relates each data item to each other data item such that the data object can be reconstructed from the component data items of the data object. In some implementations, the table can be presented to the first user through a graphical user interface (GUI) (e.g., interactive UI as described with reference to FIG. 1). The GUI can be configured to allow the user to provide an input to the collaborative electronic document. Inputs to the collaborative electronic document by the user can include an addition action (e.g., the action pertaining to an entry, or series of entries such as a "column" or "row"), a deletion action, a duplication action (e.g., a "copy" action) and a transfer action (e.g., a "paste" action).

At operation 550, in response to second user input of a second user of a second user device, processing logic adds second new data to the table and cause the table with the second new data to be presented on the first user device. In some implementations, processing logic can send, via the API, at least a portion of content of the table to a second third-party platform.

In some implementations, the collaborative electronic document can include a second table associated with the third-party platform. The second table can be based on a second tabular data schema identifying one or more second data types. In some implementations the one or more second data types can include a portion of the one or more data types of the first table associated with the third-party platform. In some implementations, the second table can be associated with a second third-party platform.

In some implementations, processing logic can receive a third-party synchronization request to synchronize content of the table in the collaborative electronic document with content of one or more sources hosted by the third-party platform. In some implementations, the third-party synchronization request can be received from a second third-party platform. A synchronization request can include new synchronization data and can request updated entries of the table of the collaborative electronic document. In response to the third-party synchronization request, processing logic can send data for the table (e.g., content of the table) to the third-party platform via the API. In some implementations, processing logic can send only a portion of contents of the table of the collaborative electronic document to the third-party that sent the synchronization request.

Figure 6:
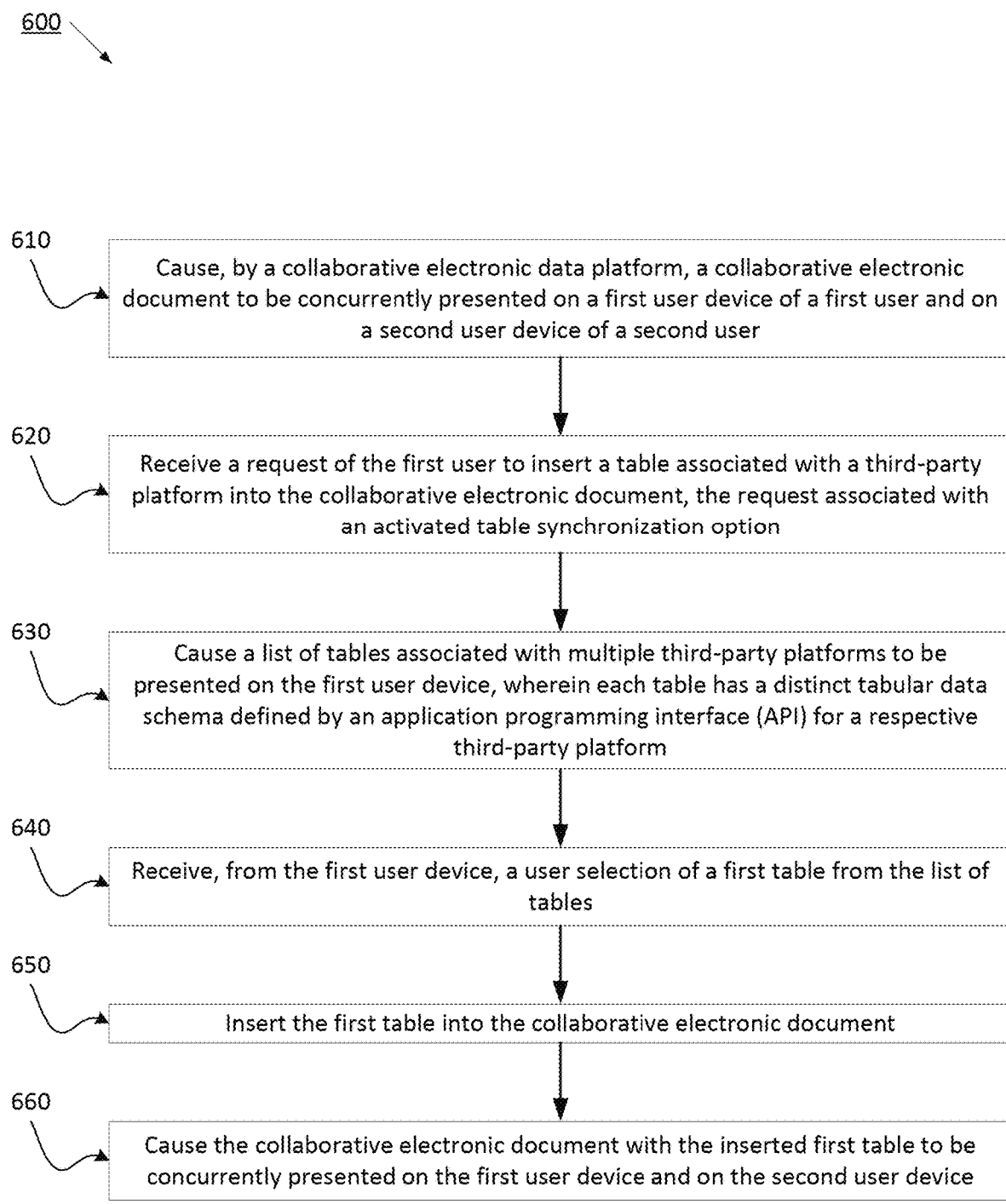
FIG. 6 depicts a flow diagram of an example method for an automated synchronization of third-party data from within a collaborative electronic data platform, in accordance with aspects of the disclosure.

FIG. 6 depicts a flow diagram of an example of a method 600 for an automated synchronization of third-party data from within a collaborative electronic data platform, in accordance with aspects of the disclosure. Method 600 can be performed by processing logic that can include hardware (circuitry, dedicated logic, etc.), software (e.g., instructions run on a processing device), or a combination thereof. In one implementation, some, or all of the operations of method 600 can be performed by one or more components of system 100 of FIG. 1. In some implementations, some, or all of the operations of method 600 can be performed by DSE 141 as described above.

At operation 610, processing logic performing the method 600 (e.g., DSE 141) causes, by a collaborative electronic data platform, a collaborative electronic document to be concurrently presented on a first user device of a first user and on a second user device of a second user.

At operation 620, processing logic receives a request of the first user to insert a table associated with a third-party platform into the collaborative electronic document, the request associated with an activated table synchronization option. In some implementations, the table can be based on a tabular data schema identifying one or more data types. The tabular data schema can be associated with content of one or more sources hosted by the third-party platform. In some implementations, in response to first user input of the first user, processing logic can add first new data to the first table. The first user input can include a data item or a data object. As described above, the data object can include multiple data items.

At operation 630, processing logic causes a list of tables associated with the third-party platform to be presented on the first user device, wherein each table has a distinct tabular data schema defined by an application programming interface (API) for a respective third-party platform. In some implementations, processing logic can receive a second request from the first user (or a second user) to insert a second table associated with the third-party platform into the collaborative electronic document. In some implementations, the second table can be associated with a second third-party platform and processing logic can cause a list of tables for the respective third-party platform to be presented to the first (or second) user device.

At operation 640, processing logic receives, from the first user device, a user selection of a first table from the list of tables. In some implementations, processing logic can receive the user selection of the first table from a second user device, or a user selection of a second table (e.g., a table pertaining to a second third-party platform) from the first user device.

At operation 650, processing logic inserts the first table into the collaborative electronic document. In some implementations, processing logic can send a synchronization request to one or more third-party platforms associated with the inserted table requesting content to populate entries of the inserted table. In some implementations, the first user (or the second user) can select a configurable table data schema and define a custom data schema. In some implementations the custom data schema can be associated with multiple third-party platforms.

At operation 660, processing logic causes the collaborative electronic document with the inserted first table to be concurrently presented on the first user device and on the second user device. In some implementations, processing logic can cause the collaborative electronic document with the inserted first table to available for concurrent presentation to one or more third-party devices (e.g., devices associated with one or more third-party platforms associated with the inserted table).

Figure 7:
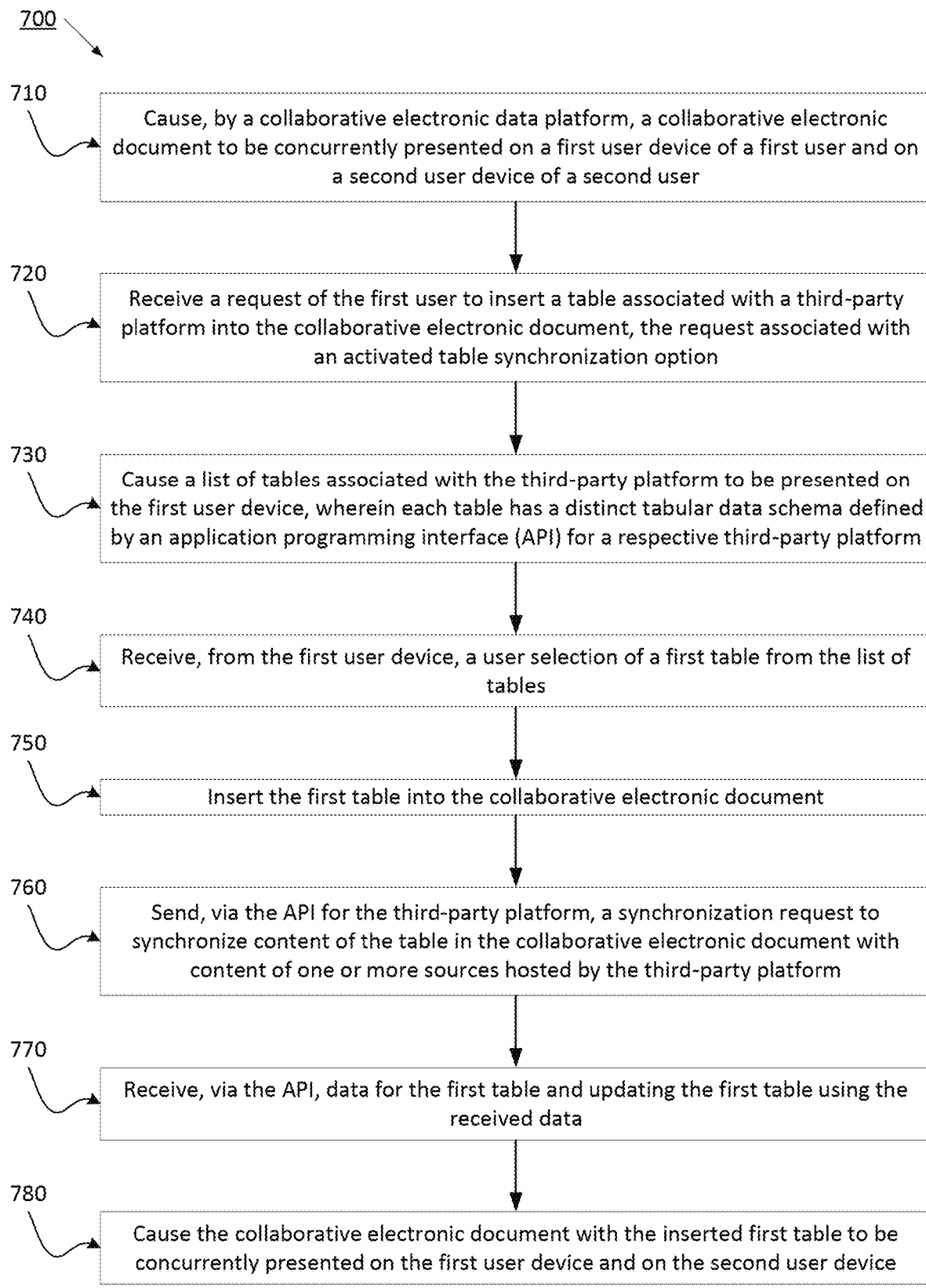
FIG. 7 depicts a flow diagram of an example method for an automated synchronization of third-party data from within a collaborative electronic data platform, in accordance with aspects of the disclosure.

FIG. 7 depicts a flow diagram of an example of a method 700 for an automated synchronization of third-party data from within a collaborative electronic data platform, in accordance with aspects of the disclosure. Method 700 can be performed by processing logic that can include hardware (circuitry, dedicated logic, etc.), software (e.g., instructions run on a processing device), or a combination thereof. In one implementation, some, or all of the operations of method 700 can be performed by one or more components of system 100 of FIG. 1. In some implementations, some, or all of the operations of method 700 can be performed by DSE 141 as described above.

At operation 710, processing logic performing the method 700 (e.g., DSE 141) causes, by a collaborative electronic data platform, a collaborative electronic document to be concurrently presented on a first user device of a first user and on a second user device of a second user.

At operation 720, processing logic receive a request of the first user to insert a table associated with a third-party platform into the collaborative electronic document, the request associated with an activated table synchronization option.

At operation 730, processing logic causes a list of tables associated with the third-party platform to be presented on the first user device, wherein each table has a distinct tabular data schema defined by an application programming interface (API) for a respective third-party platform.

At operation 740, processing logic receives, from the first user device, a user selection of a first table from the list of tables.

At operation 750, processing logic inserts the first table into the collaborative electronic document.

At operation 760, processing logic sends, via the API for the third-party platform, a synchronization request to synchronize content of the table in the collaborative electronic document with content of one or more sources hosted by the third-party platform.

At operation 770, processing logic receives, via the API, data for the first table and updates the first table using the received data.

At operation 780, processing logic causes the collaborative electronic document with the inserted first table to be concurrently presented on the first user device and on the second user device.

Figure 8:
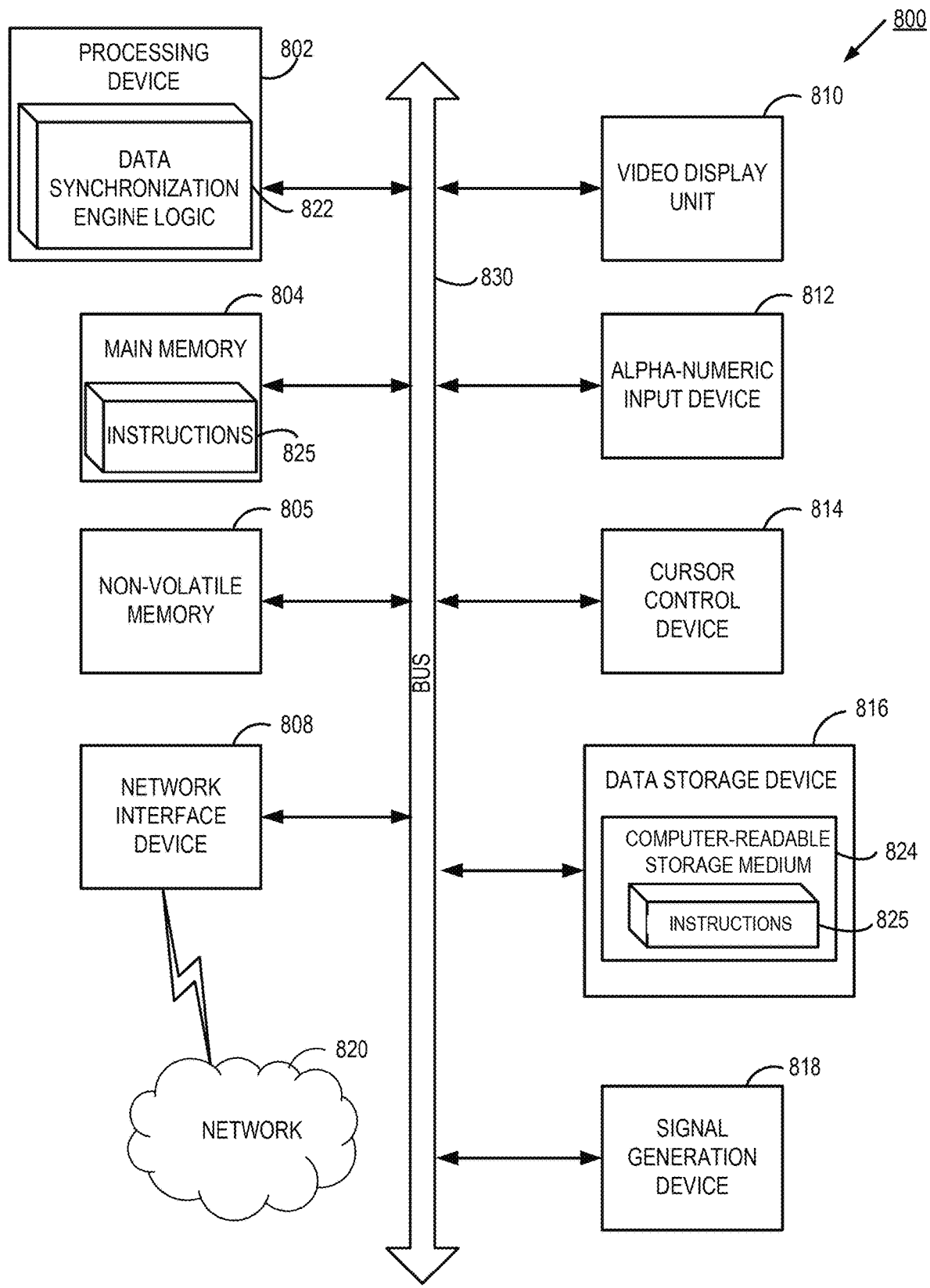
FIG. 8 is a block diagram illustrating an exemplary computer system, in accordance with aspects of the disclosure.

FIG. 8 is a block diagram illustrating an example of a computer system 800, in accordance with aspects of the disclosure. The computer system 800 can correspond to platform 120 and/or client devices 102A-N, described in FIG. 1. Computer system 800 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device 802 (e.g., a processor), a main memory 804 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 805 (e.g., flash memory, static random access memory (SRAM), etc.), and a data storage device 816, which communicate with each other via a bus 830.

Processing device 802 represents one or more general-purpose processing devices such as a microprocessor, central processing unit, or the like. More specifically, processing device 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 can also be one or more special-purpose processing devices such as an application specific integrated circuit (ASIC), a field programmable gate array (FPGA), a digital signal processor (DSP), network processor, or the like. The processing device 802 is configured to execute data synchronization engine logic 822 (e.g., for synchronizing data between platforms) for performing the operations discussed herein. The processing device 802 can be configured to execute instructions 825 stored in main memory 804. Non-volatile memory 805 can store the instructions 825 when they are not being executed, and can store additional system data that can be accessed by processing device 802.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 818 (e.g., a speaker).

The data storage device 816 can include a computer-readable storage medium 824 (e.g., a non-transitory machine-readable storage medium) on which is stored one or more sets of instructions 825 (e.g., for generating variations of a translated audio portion) embodying any one or more of the methodologies or functions described herein. The instructions can also reside, completely or at least partially, within the main memory 804 and/or within the processing device 802 during execution thereof by the computer system 800, the main memory 804 and the processing device 802 also constituting machine-readable storage media. The instructions can further be transmitted or received over a network 820 via the network interface device 808.

While the computer-readable storage medium 824 (machine-readable storage medium) is illustrated in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding, or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a specific feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the specific features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specific by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:
providing, by a collaborative electronic data platform, a collaborative electronic document for presentation on a first user device of a first user, the collaborative electronic document comprising a first table associated with a third-party platform, the first table comprising a first plurality of data objects, wherein each data object comprises one or more respective data items;
determining that a table synchronization option is activated for the first table;
sending, via an application programming interface (API) for the third-party platform, a first synchronization request to synchronize content of the first table in the collaborative electronic document with content of one or more sources associated with the third-party platform, the one or more sources comprising one or more data items;
receiving, via the API, one or more data items for the first table and updating the first table using the one or more received data items;
in response to first user input of the first user, updating a first data object of the first table based on a first new data item and causing the first table with the updated first data object to be presented on the first user device; and
in response to second user input of a second user of a second user device, updating a second data object of the first table based on a second new data item and causing the first table with the updated second data object to be presented on the first user device.

2. The method of claim 1, wherein the first table is based on a first tabular data schema identifying one or more data types, wherein the first tabular data schema is associated with the content of the one or more sources associated with the third-party platform.

3. The method of claim 2, wherein the one or more data types comprise at least one of a data item or a data object.

4. The method of claim 3, wherein a respective data object is added to the first table of the collaborative electronic document as a plurality of respective data items.

5. The method of claim 2, wherein the first tabular data schema is configured by the third-party platform.

6. The method of claim 2, wherein the collaborative electronic document comprises a second table associated with the third-party platform, wherein the second table is based on a second tabular data schema identifying one or more second data types, and wherein the method further comprises:
determining that the table synchronization option is activated for the second table;
sending, via the API, a second synchronization request to synchronize content of the second table in the collaborative electronic document with content of one or more second sources associated with the third-party platform, wherein the second tabular data schema is associated with content of the one or more second sources;
receiving, via the API, second data for the second table and updating the second table using the second data; and
causing the second table to be available for presentation on the first user device.

7. The method of claim 1, further comprising:
receiving, via the API, a first third-party synchronization request to synchronize content of the table in the collaborative electronic document with content of one or more sources associated with the third-party platform; and
sending to the third-party platform, via the API, a portion of the first table.

8. The method of claim 7, further comprising:
receiving, via the API, a second third-party synchronization request to synchronize content of the first table in the collaborative electronic document with content of one or more second sources hosted by a second third-party platform; and
sending to the second third-party platform, via the API, a portion of the first table.

9. The method of claim 1, further comprising:
in response to the first user input, sending a second synchronization request to synchronize content of the table in the collaborative document with the content of the one or more sources associated with the third-party platform; and
sending to the third-party platform, a portion of the first table.

10. The method of claim 9, wherein the first table is also associated with a second third-party platform, the method further comprising:
sending to the second third-party platform, a portion the first table.

11. The method of claim 10, wherein the portion of the first table is sent to the third-party platform via a first API and to the second third-party platform via a second API.

12. The method of claim 1 wherein the first user input comprises at least one of a data item and or a data object.

13. The method of claim 1, wherein causing the first table to be presented on the first user device comprises providing a graphical user interface (GUI) presenting the first table and allowing the first user to provide the first user input for the collaborative electronic document, wherein the first user input comprises at least one of an addition action, a deletion action, a duplication action, or a transfer action.

14. A method comprising:
causing, by a collaborative electronic data platform, a collaborative electronic document to be concurrently presentation on a first user device of a first user and on a second user device of a second user;
receiving a request of the first user to insert a table associated with a third-party platform into the collaborative electronic document;
causing a list of tables associated with a plurality of third-party platforms to be presented on the first user device, wherein each table has a distinct tabular data schema defined by an application programming interface (API) for a respective third-party platform of the plurality of third-party platforms;

receiving, from the first user device, a user selection of a first table from the list of tables;

inserting the first table into the collaborative electronic document; and causing the collaborative electronic document with the inserted first table to be concurrently presented on the first user device and on the second user device.

15. The method of claim 14, wherein the first table is based on a tabular data schema identifying one or more data types, wherein the tabular data schema is associated with content of one or more sources associated with the third-party platform.

16. The method of claim 15, further comprising:

in response to first user input of the first user, adding first new data to the first table, the first user input comprising at least one of a data item or a data object, wherein the data object comprises a plurality of respective data items; and causing the first table with the first new data to be concurrently presented on the first user device and the second user device.

17. The method of claim 15, further comprising:

receiving a second request of the first user to insert a second table associated with the third-party platform into the collaborative electronic document;

causing the list of tables associated with the third-party platform to be presented on the first user device;

receiving, from the first user device, a second user selection of the second table from the list of tables;

inserting the second table into the collaborative electronic document; and causing the collaborative electronic document with the inserted second table to be concurrently presented on the first user device and on the second user device.

18. The method of claim 15, further comprising:

receiving a second request of the second user to insert a second table associated with a second third-party platform into the collaborative electronic document;

causing a second list of tables associated with the second third-party platform to be presented on the first user device;

receiving, from the first user device, a second user selection of the second table from the second list of tables;

inserting the second table into the collaborative electronic document; and causing the collaborative electronic document with the inserted second table to be concurrently presented on the first user device and on the second user device.

19. The method of claim 15, further comprising:

sending, via the API for the third-party platform, a synchronization request to synchronize content of the first table in the collaborative electronic document with the content of one or more sources associated with the third-party platform.

20. A system comprising:

a memory; and a processor communicatively coupled to the memory, the processor to perform operations comprising:

providing, by a collaborative electronic data platform, a collaborative electronic document to be concurrently presented on a first user device of a first user and a second user device of a second user;

receiving a request of the first user to insert a table associated with a third-party platform of a plurality of third-party platforms into the collaborative electronic document;

causing a list of tables associated with the plurality of third-party platforms to be presented on the first user device, wherein each table has a distinct tabular data schema defined by an application programming interface (API) for the third-party platform of the plurality of third-party platforms;

receiving from the first user device, a user selection of a first table from the list of tables;

inserting the first table into the collaborative electronic document;

sending, via the API for the third-party platform, a synchronization request to synchronize content of the table in the collaborative electronic document with content of one or more sources associated with the third-party platform;

receiving, via the API, data for the first table and updating the first table using the received data; and causing the collaborative electronic document with the inserted first table to be concurrently presented on the first user device and on the second user device.

\* \* \* \* \*